(12) United States Patent
Boulanger et al.

(10) Patent No.: US 10,704,770 B2
(45) Date of Patent: Jul. 7, 2020

(54) LIGHTING ARRANGEMENT

(71) Applicant: CP IP Holdings Limited, Central Hong Kong (CN)

(72) Inventors: Dave Boulanger, Hong Kong (CN); Maciej Nowakowski, West Vancouver (CA)

(*) Notice: Subject to any disclaimer, the term of this patent is extended or adjusted under 35 U.S.C. 154(b) by 0 days.

(21) Appl. No.: 16/561,140

(22) Filed: Sep. 5, 2019

(65) Prior Publication Data

US 2020/0080709 A1 Mar. 12, 2020

Related U.S. Application Data

(60) Provisional application No. 62/729,436, filed on Sep. 11, 2018.

(51) Int. Cl.
| | | |
|---|---|---|
| *F21V 21/04* | (2006.01) | |
| *F21V 17/10* | (2006.01) | |
| *F21V 19/00* | (2006.01) | |

(52) U.S. Cl.
CPC .............. *F21V 21/04* (2013.01); *F21V 17/10* (2013.01); *F21V 19/004* (2013.01); *F21V 19/0045* (2013.01); *F21V 21/045* (2013.01)

(58) Field of Classification Search
CPC .... F21V 21/044; F21V 21/045; F21V 21/046; F21V 17/10; F21V 17/14; F21V 19/004; F21V 19/0045

See application file for complete search history.

(56) References Cited

U.S. PATENT DOCUMENTS

| | | | |
|---|---|---|---|
| 3,127,145 A | 3/1964 | McGinty | |
| 5,526,553 A | 6/1996 | Klein | |
| 6,293,510 B1 | 9/2001 | Bradford et al. | |
| 7,063,555 B1* | 6/2006 | Mullen | H01R 33/05 439/364 |
| 8,066,412 B2 | 11/2011 | Vann et al. | |
| 9,341,349 B1* | 5/2016 | Moore | F21V 19/002 |
| 9,464,790 B2 | 10/2016 | Badley et al. | |
| 2002/0118545 A1 | 8/2002 | Bucher et al. | |
| 2002/0167257 A1* | 11/2002 | Shen | F21V 17/164 313/318.01 |

(Continued)

FOREIGN PATENT DOCUMENTS

| | | |
|---|---|---|
| DE | 19946621 A1 | 9/2001 |
| DE | 202006006613 U1 | 7/2006 |

(Continued)

*Primary Examiner* — Alexander K Garlen
(74) *Attorney, Agent, or Firm* — Black, McCuskey, Souers & Arbaugh LPA

(57) ABSTRACT

A lighting arrangement can include a mounting bracket, a luminaire, at least one first spring arm, and at least one second spring arm. The mounting bracket can be releasably mountable to at least one of a junction box, a wall and a ceiling. The luminaire can extend along a longitudinal axis between a light emanating face and a rear face. The at least one first spring arm can extend between a base end and a distal end wherein the base end can be mounted to a first of the mounting bracket and the luminaire. The at least one second spring arm can extend between a base end and a distal end wherein the base end of the at least one second spring arm can be mounted to a second of the mounting bracket and the luminaire.

20 Claims, 13 Drawing Sheets

(56) References Cited

U.S. PATENT DOCUMENTS

| | | | |
|---|---|---|---|
| 2013/0258685 A1* | 10/2013 | Clifton | .................... F21V 15/04 |
| | | | 362/390 |
| 2017/0205053 A1 | 6/2017 | Green et al. | |
| 2018/0045880 A1 | 2/2018 | Nowakowski et al. | |
| 2018/0172247 A1* | 6/2018 | O'Brien | .................. F21V 21/02 |

FOREIGN PATENT DOCUMENTS

| | | | | |
|---|---|---|---|---|
| DE | 202013100626 U1 * | 5/2014 | ............ | F21V 21/047 |
| DE | 202018101486 U1 * | 4/2018 | ............ | F21V 19/004 |
| EP | 1139018 B1 | 3/2007 | | |
| EP | 2827053 A1 * | 1/2015 | ............ | F21V 21/025 |
| WO | 2017003863 A1 | 5/2017 | | |

* cited by examiner

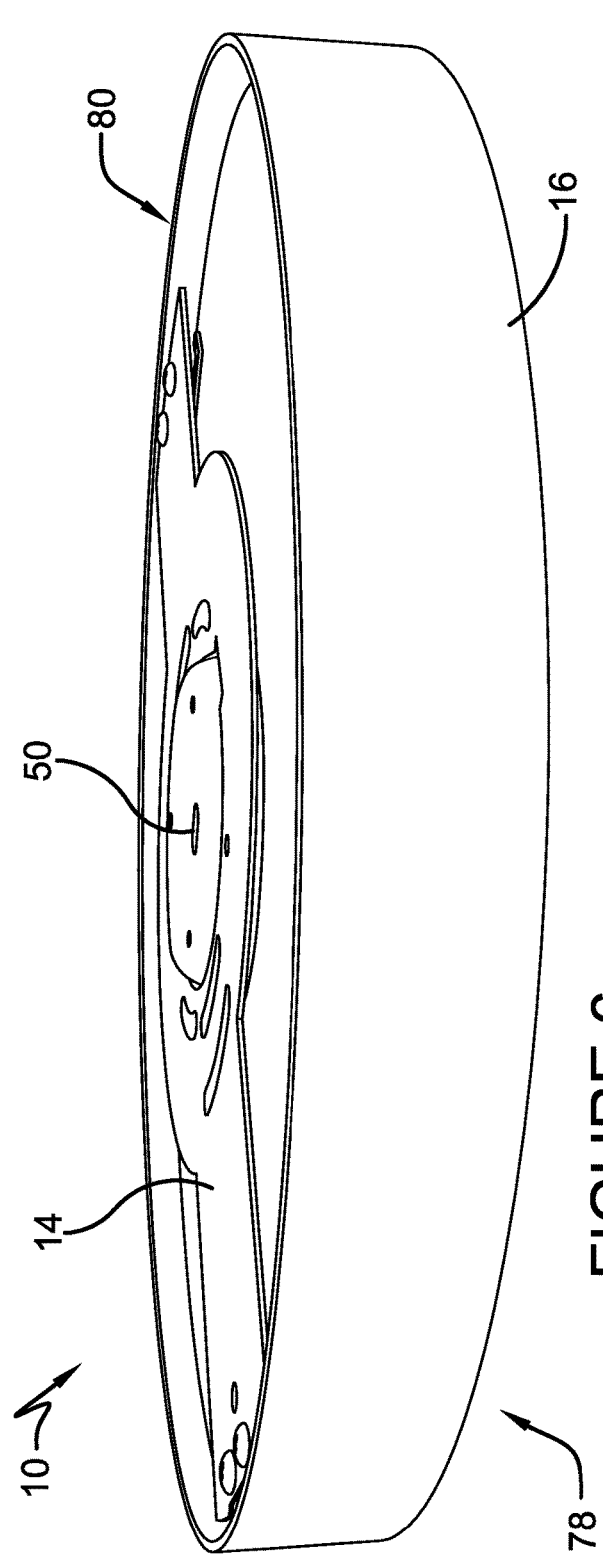

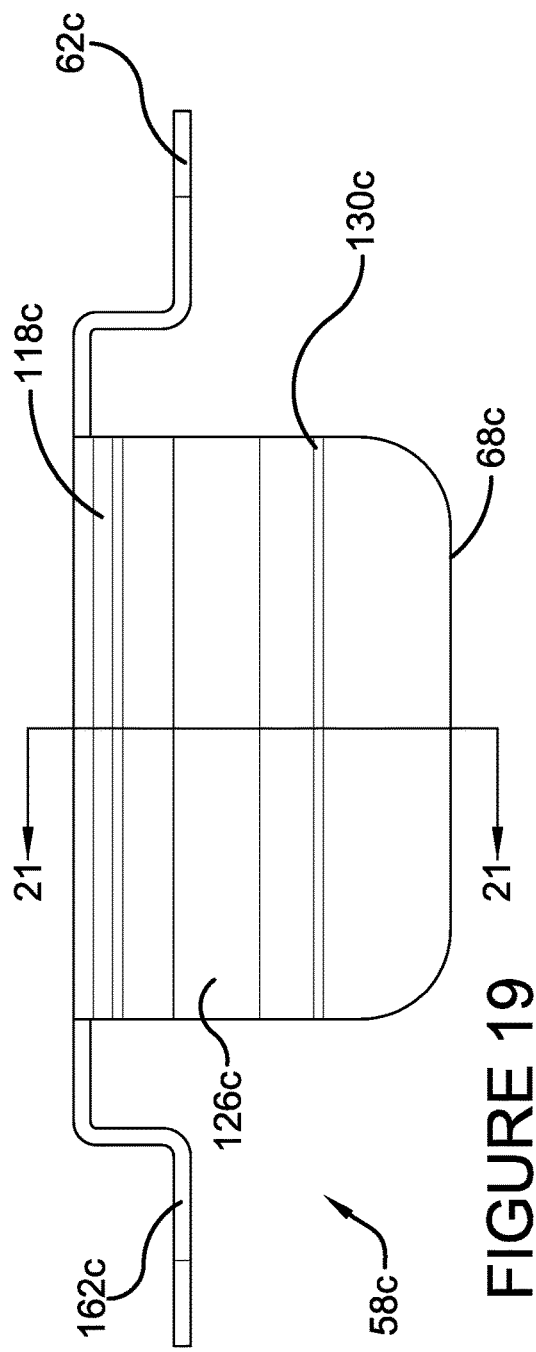
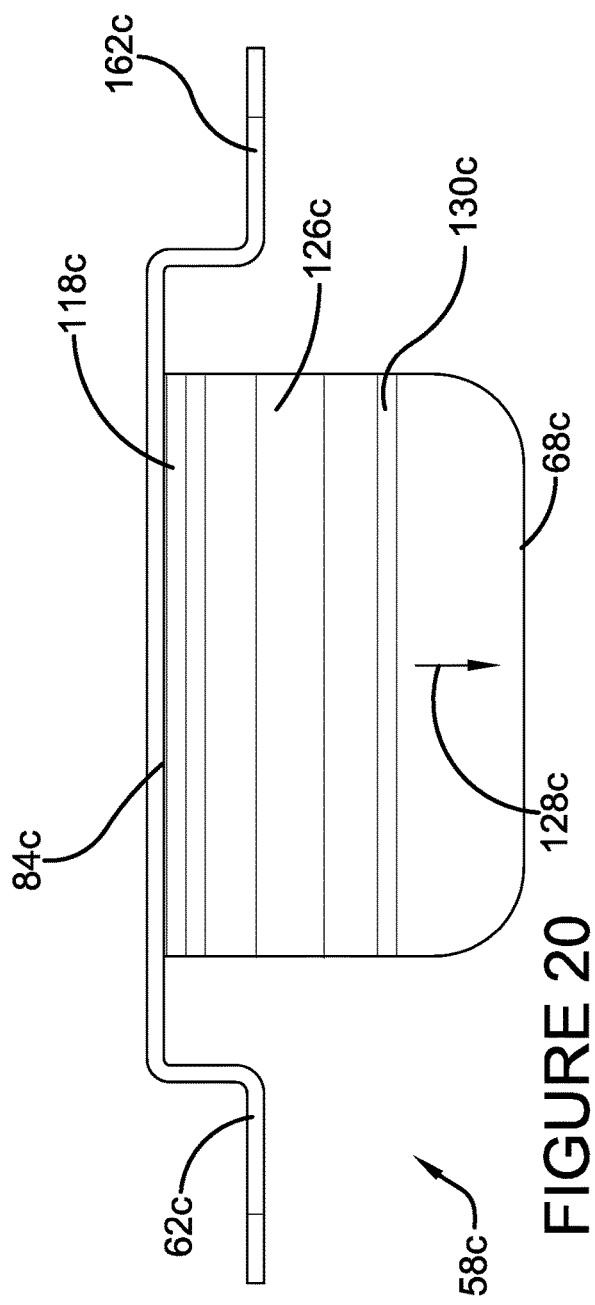

LIGHTING ARRANGEMENT

CROSS-REFERENCE TO RELATED APPLICATIONS

This application claims the benefit of U.S. Provisional Patent Application Ser. No. 62/729,436 for a LIGHTING ARRANGEMENT, filed on Sep. 11, 2018, which is hereby incorporated by reference in its entirety.

BACKGROUND

1. Field

The present disclosure relates to structures operable to emit light.

2. Description of Related Prior Art

U.S. Pat. No. 8,376,777 discloses a QUICK MOUNTING DEVICE WITH MODULES. The quick mounting device for appliances is alleged to be quickly and easily engaged and disengaged mechanically without the use of tools.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A lighting arrangement can include a mounting bracket, a luminaire, at least one first spring arm, and at least one second spring arm. The mounting bracket can be releasably mountable to at least one of a junction box, a wall and a ceiling. The luminaire can extend along a longitudinal axis between a light emanating face and a rear face. The luminaire can include at least one light emitting unit and can be configured to emit light from the light emanating face. The at least one first spring arm can extend between a base end and a distal end wherein the base end can be mounted to a first of the mounting bracket and the luminaire. The at least one second spring arm can extend between a base end and a distal end wherein the base end of the at least one second spring arm can be mounted to a second of the mounting bracket and the luminaire. The at least one first spring arm and the at least one second spring arm can be selectively engageable with one another to releasably engage the mounting bracket and the luminaire together. The at least one first spring arm and the at least one second spring arm can slide across each other as the luminaire and the mounting bracket are moved closer together along an assembly axis. The longitudinal axis can be collinear with the assembly axis when the luminaire and the mounting bracket are assembled together. At least a portion of a first surface at the base end of the at least one first spring arm can confront and contact at least a portion of a second surface of the first of the mounting bracket and the luminaire when the base end of the at least one first spring arm is mounted to the first of the mounting bracket and the luminaire. The at least a portion of the first surface and the at least a portion of the second surface can contact one another in a first plane. The first plane can be transverse to the assembly axis. The at least one first spring arm can extend away from the at least a portion of the first surface at the base end of the at least one first spring arm initially in a first direction away from the assembly axis and subsequently in a second direction transverse to the first direction and at least partially along the assembly axis. The first direction and the second direction can be defined in a second plane containing the assembly axis. A first bend can be defined in the at least one first spring arm wherein extension of the at least one first spring arm changes from the first direction at the first bend. The first bend can be further from the assembly axis than the base end of the at least one first spring arm. The at least one first spring arm can extend away from the first bend initially in the second direction at least partially along the longitudinal axis and subsequently in a third direction transverse to the second direction as well as transverse and non-perpendicular to the assembly axis. The third direction can be defined in the second plane. A second bend can be defined in the at least one first spring arm wherein extension of the at least one first spring arm changes from the second direction to the third direction at the second bend. The second bend can be spaced further from the first plane along the assembly axis than the first bend. The at least one first spring arm can extend away from the second bend initially in the third direction and subsequently in a fourth direction transverse to the third direction as well as transverse and non-perpendicular to the assembly axis. The fourth direction can be defined in the second plane. A third bend can be defined in the at least one first spring arm wherein extension of the at least one first spring arm changes from the third direction to the fourth direction at the third bend. The third bend can be spaced further from the first plane along the assembly axis than the second bend. The at least one first spring arm can extend away from the third bend initially in the fourth direction and subsequently in a fifth direction to the distal end of the at least one first spring arm. The fifth direction can be parallel to the assembly axis. The fifth direction can be defined in the second plane. A fourth bend can be defined in the at least one first spring arm wherein extension of the at least one first spring arm changes from the fourth direction to the fifth direction at the fourth bend. The fourth bend can be spaced further from the first plane along the assembly axis than the third bend. The distal end of the at least one first spring arm can be spaced further from the first plane along the assembly axis than the first bend, the second bend, the third bend, and the fourth bend.

BRIEF DESCRIPTION OF THE DRAWINGS

The detailed description set forth below references the following drawings:

FIG. 6 is a second perspective view of the components of the lighting arrangement shown in FIGS. 2-4 assembled together but not mounted to a mounting surface such as a wall or ceiling;

FIG. 7 is a cross-sectional view of the components of the lighting arrangement shown in FIGS. 2-4 assembled together but not mounted to a mounting surface such as a wall or ceiling (it is noted that structures cut-through in the plane of the cross-section have been colored);

FIG. 19 is a left-side view of the exemplary second spring arm;

FIG. 20 is a right-side view of the exemplary second spring arm; and

DETAILED DESCRIPTION

Figure 1:
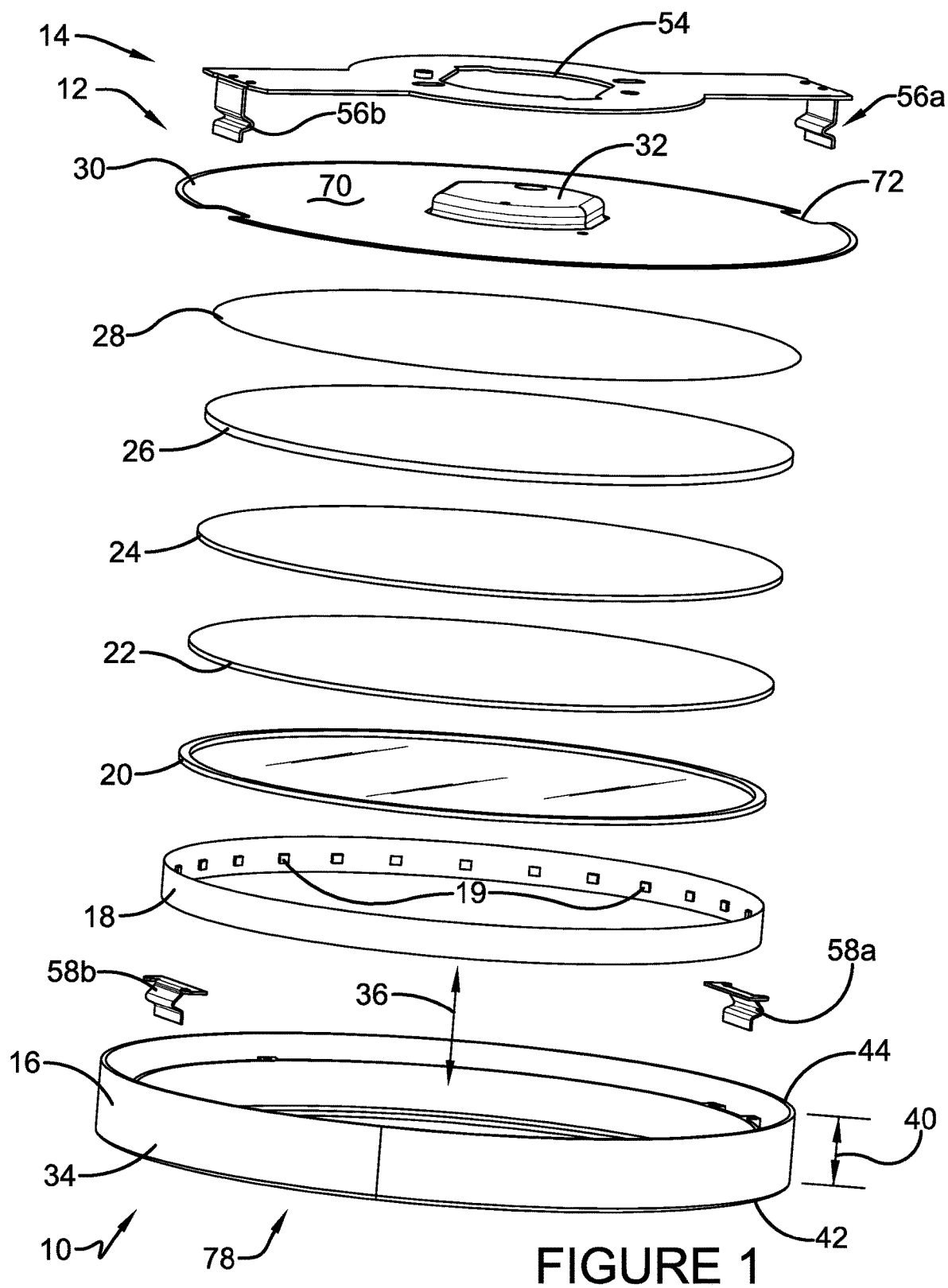
FIG. 1 is an exploded view of a lighting arrangement according to an exemplary embodiment of the present disclosure.

The present disclosure, as demonstrated by the exemplary embodiment described below, can provide lighting arrangements that do not require an installer to make additional holes into the ceiling or wall mounting location. Lighting arrangements according to one or more embodiments of the present disclosure can attach directly into a standard junction box used in building construction. Lighting arrangements according to one or more embodiments of the present disclosure can be comprised of two main components that are attached together without the need for tools. Further, embodiments of the present disclosure can provide a lighting arrangement that does not protrude into the junction box. In addition, an installer can easily align the luminaire with spring arms fixed to a mounting bracket and pop it up into place without having to see alignment. If it is not correctly aligned initially, the installer can turn the luminaire until spring arms fall into slots defined by the luminaire. Also, the dual spring arm system provides for additional holding strength after easy installation.

A lighting arrangement 10 according to an exemplary embodiment of the present disclosure can include a luminaire 12 and a mounting bracket 14. The mounting bracket 14 can be releasably mountable to at least one of a junction box, a wall and a ceiling. The luminaire 12 can extend along a longitudinal axis 36 between a light emanating face 78 and a rear face 80.

The exemplary luminaire 12 includes a casing 16, a printed circuit board (PCB) 18 with light emanating units in the form of light emitting diodes (LEDs) 19, a gasket 20, a glass or lens 22, a diffuser 24, a light guide 26 with a backing of reflective paper 28, and a backing plate 30. While not shown, a driving circuitry can be positioned in a hub 32 of the backing plate 30. The hub 32 of the luminaire 12 is positioned at the rear face 80. The lighting arrangement 10 can be compact, easily installed, and powered directly from the junction box without a transformer.

The casing 16 can have a perimeter wall 34 extending about the axis 36. The perimeter wall 34 can take any desired shape, including square, circular, oval, rectangular, or any other shape. The casing 16 can also have bottom lip 38 projecting from the perimeter wall 34 toward the axis 36. The casing 16 can have a vertical height 40 along the axis 36 between a bottom surface 42 and a top surface 44.

A cavity 46 can be defined vertically between the bottom lip 38 and the mounting bracket 12 and defined radially by the perimeter wall 34 (as used here, "radially" refers to a direction away from the axis and does not necessarily imply any particular shape). The gasket 20 can be placed on the bottom lip 38. The lens 22 can be placed on the gasket 20 which can compress until the lens 22 is also supported by the lip 38. The diffuser 24 can rest on the lens 22. The light guide 26 with the backing of reflective paper 28 can rest on the diffuser 24. The lens 22 can be at least partially transparent and can be formed from glass or 5VA plastic. A block of EVA foam (not shown) can be positioned between the driving circuitry in the hub 32 and the light guide 26/backing of reflective paper 28 along the axis 36. The plurality of LEDs 19 can be disposed about the perimeter wall 34 within the cavity 46. The plurality of light emitting diodes 24 can be directed at a side of the light guide 26 and generally at the axis 36. In the exemplary embodiment, the backing plate 30 can be interconnected to the casing 16 with fasteners, such as referenced at 48, to enclose the other components of the luminaire 12. The casing 16 can define bosses for receiving screws that pass through apertures in the backing plate 30, for example. Wiring from the driving circuitry can pass out of the luminaire 12 through an aperture 50 in the hub 32, to be connected to a power source such as the grid.

Figure 2:
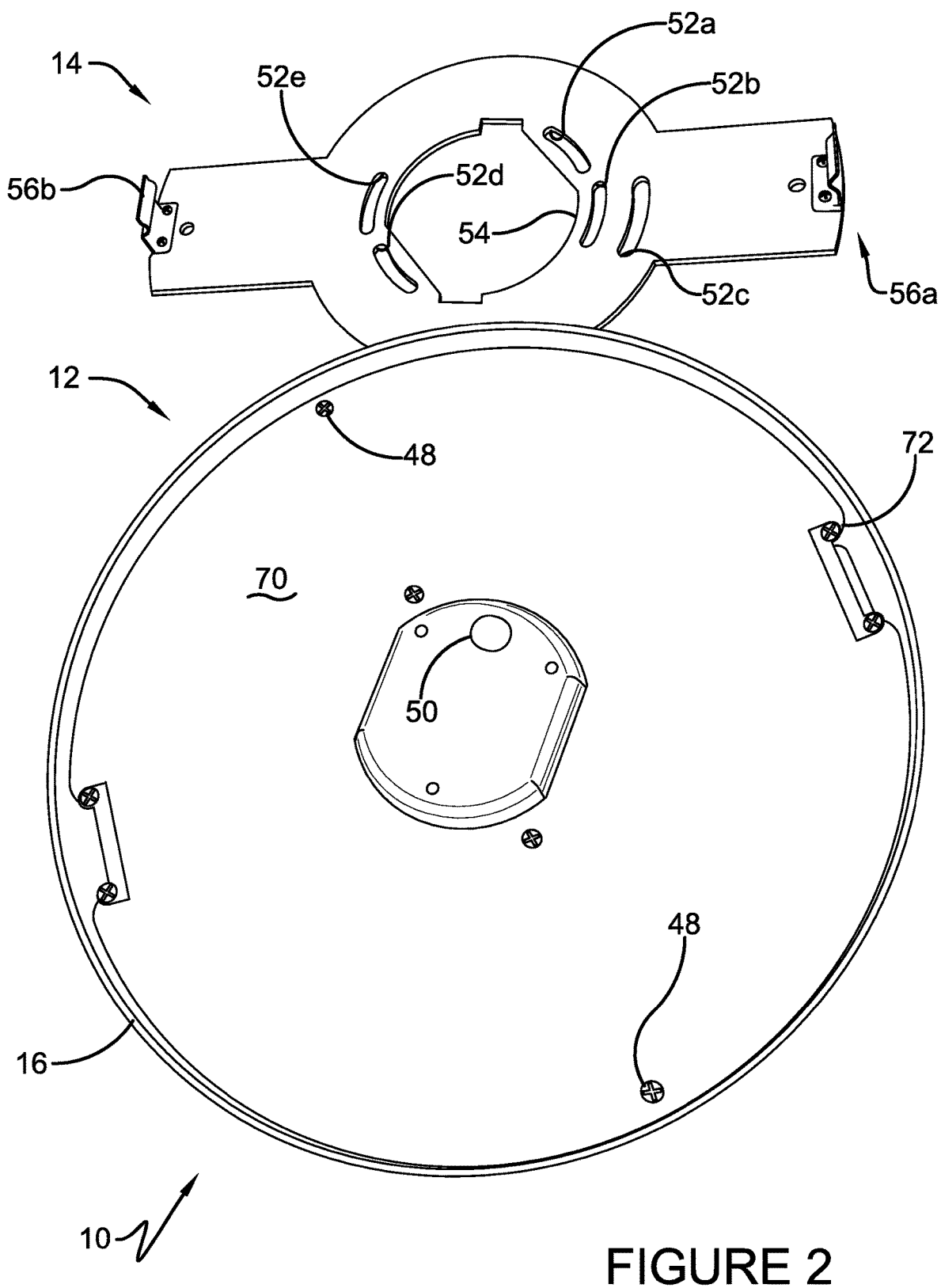
FIG. 2 is a perspective view of components of the lighting arrangement shown in FIG. 1 in a dissembled condition.
Figure 3:
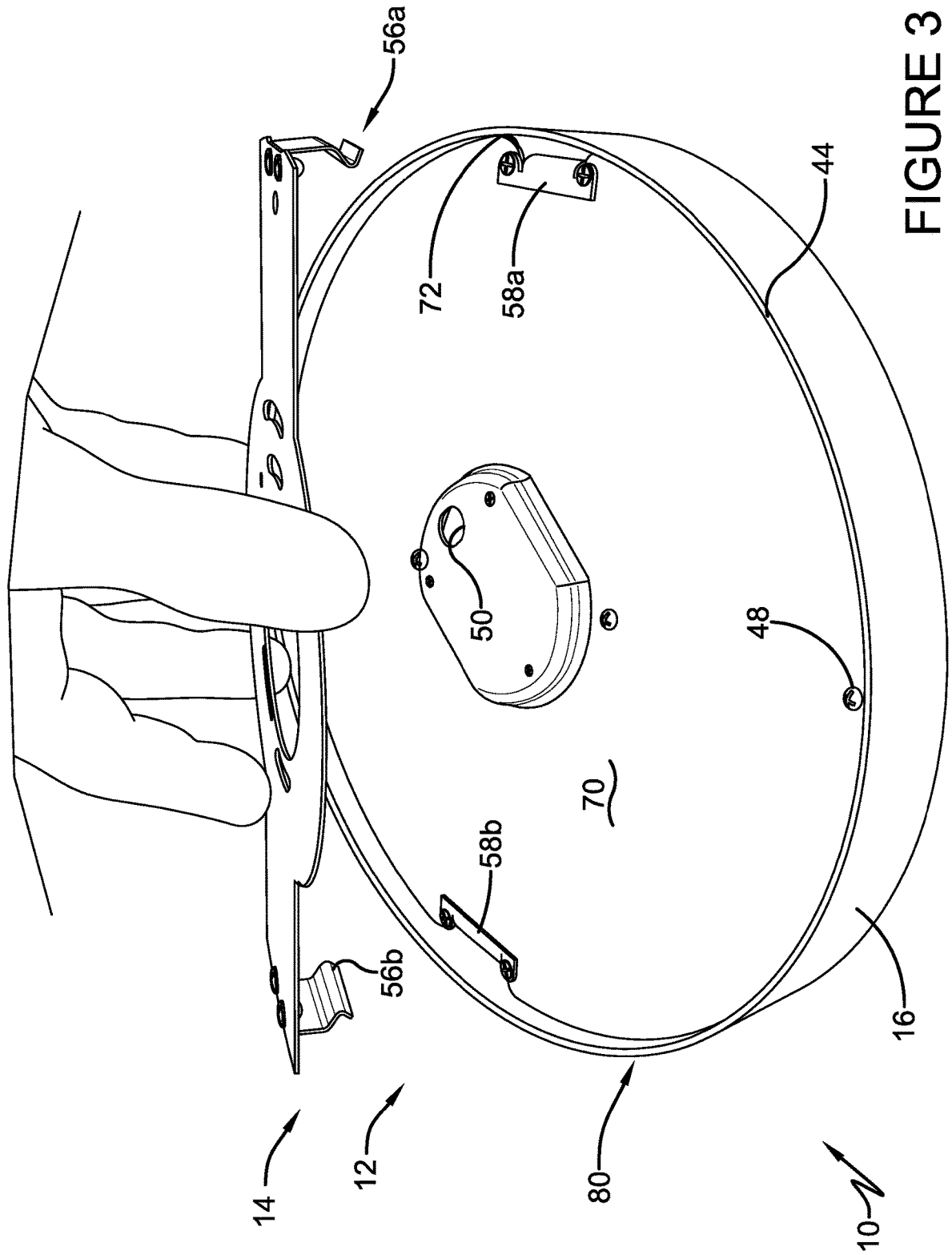
FIG. 3 is a perspective view of the components of the lighting arrangement shown in FIG. 2 in a first stage of being assembled together.
Figure 4:
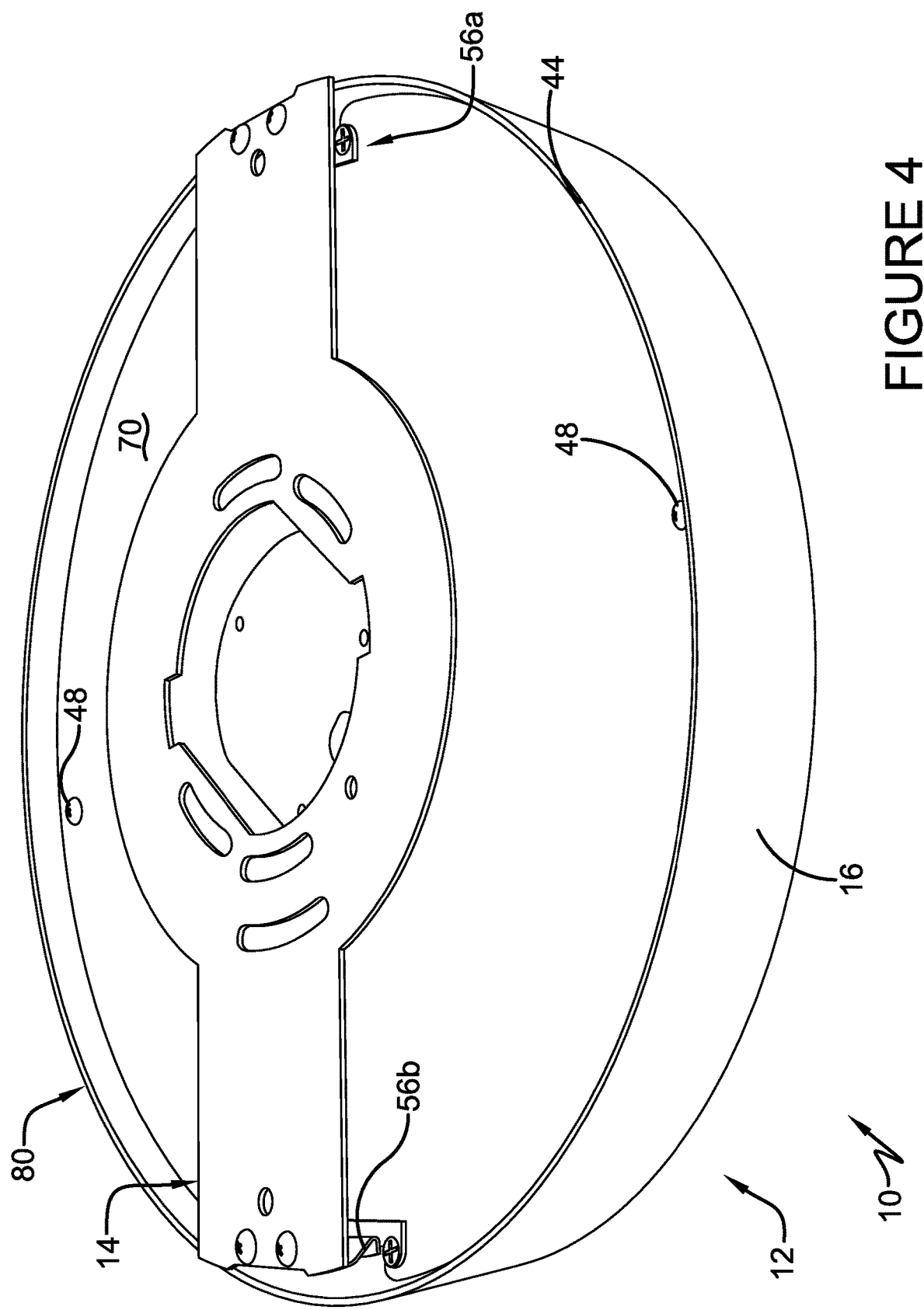
FIG. 4 is a perspective view of the components of the lighting arrangement shown in FIGS. 2 and 3 in a second stage of being assembled together subsequent to the first stage.
Figure 5:
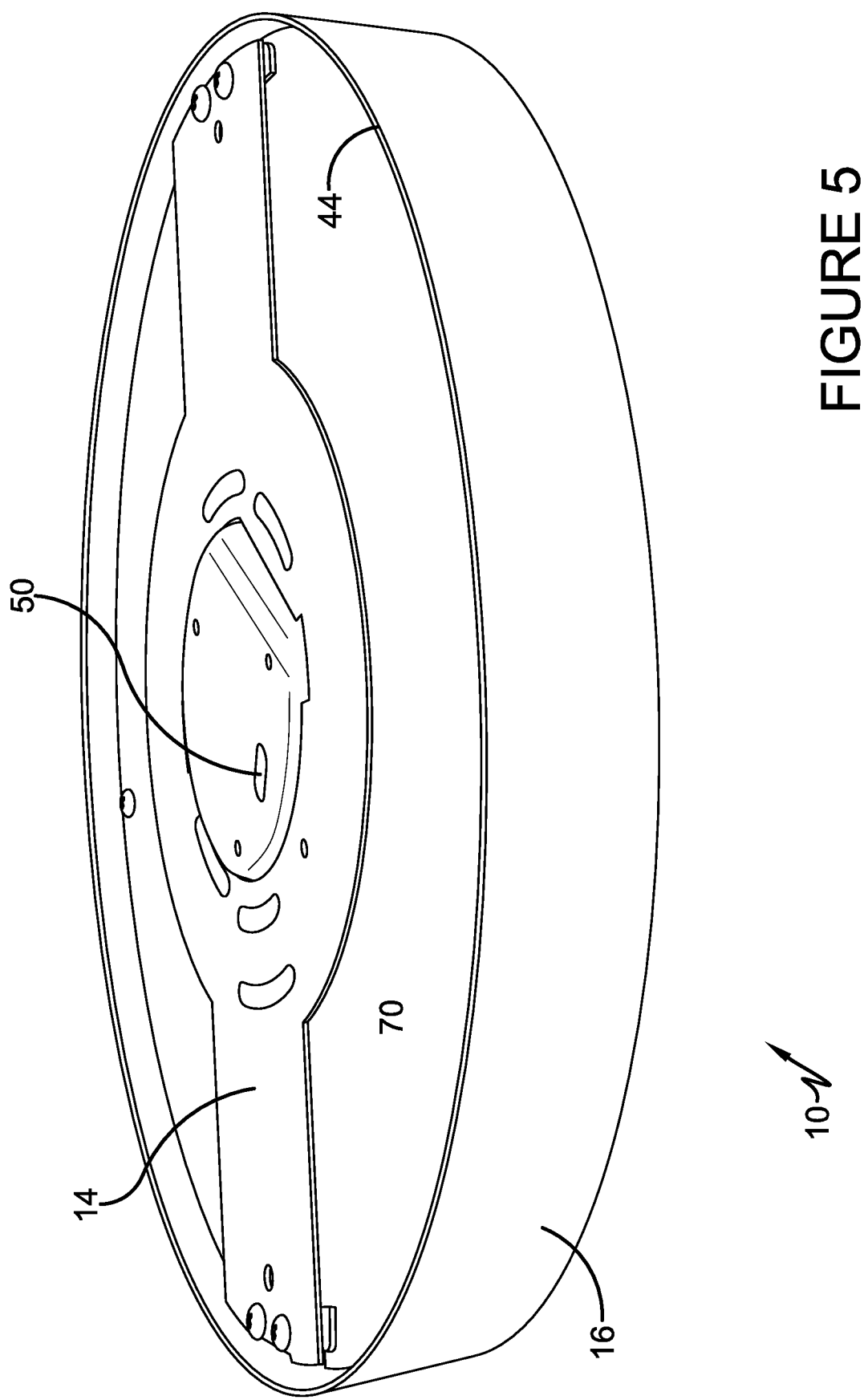
FIG. 5 is a first perspective view of the components of the lighting arrangement shown in FIGS. 2-4 assembled together but not mounted to a mounting surface such as a wall or ceiling.
Figure 8:
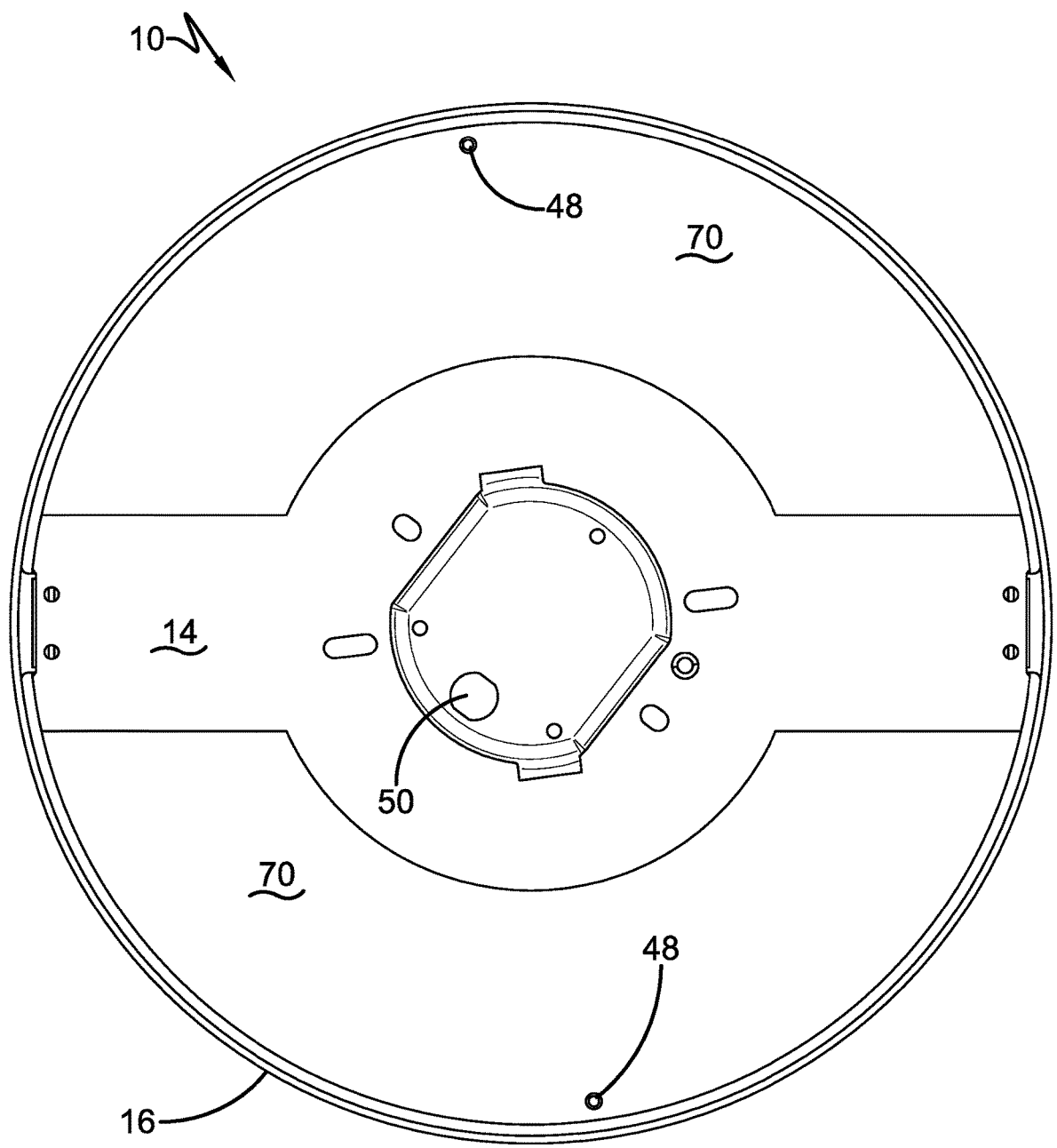
FIG. 8 is a top view of the lighting arrangement.

The mounting bracket 14 can be configured to be affixed to a wall or a ceiling. The mounting bracket 14 can include apertures to accommodate interconnection of the mounting bracket 14 with an electrical junction box through fasteners such as screws or bolts. The mounting bracket 14 can include a plurality of different aperture patterns to accommodate interconnection with differently-configured electrical junction boxes. Exemplary apertures for connecting to a junction box are referenced at 52a-52e in FIG. 2. An exemplary aperture 54 is utilized to receive the hub 32 and allow for the passage of wires between the junction box and the driving circuit 28. The exemplary aperture 54 is spaced from the first spring arm 56a and the second spring arm 58a and is centered on the assembly axis 36.

The exemplary lighting arrangement 10 also includes a plurality of first spring arms and a plurality of second spring arms that facilitate interconnection between the luminaire 12 and the mounting bracket 14. The designations "first" and "second" are applied to distinguish between the arms and not to suggest an order of preference or importance. The exemplary first spring arms are associated with the mounting bracket 14 and are referenced at 56a and 56b. The exemplary second spring arms are associated with the luminaire 12 and are referenced at 58a and 58b. The first spring arm 56a and the second spring arm 58a can be selectively engageable with one another to releasably engage the mounting bracket 14 and the luminaire 12 together and the first spring arm 56b and the second spring arm 58b can be selectively engageable with one another to releasably engage the mounting bracket 14 and the luminaire 12 together, as will be described in greater detail below. The first spring arm 56a and the second spring arm 58a can slide across each other as the luminaire 12 and the mounting bracket 14 are moved closer together along an assembly axis. The first spring arm 56b and the second spring arm 58b can slide across each other as the luminaire 12 and the mounting bracket 14 are moved closer together along an assembly axis. The longitudinal axis 36 can be collinear with the assembly axis when the luminaire 12 and the mounting bracket 14 are assembled together, therefore the "longitudinal axis" and the "assembly axis" are used interchangeably herein. It is noted that in other embodiments of the present disclosure, the first spring arms 56a, 56b could be associated with the luminaire 12 and the second spring arms 58a, 58b could be associated with the mounting bracket 14. The exemplary first spring arms 56a, 56b are the same shape but could be shaped differently from one another in other embodiments of the present disclosure. The exemplary second spring arms 58a, 58b are the same shape but could be shaped differently from one another in other embodiments of the present disclosure. Also, the shapes of the arms 56a, 56b, 58a, 58b are exemplary and could be different in other embodiments of the present disclosure. The structures of the exemplary arms 56a and 58a as well as the interaction of the exemplary arms 56a and 58a will be discussed below; the structures of the exemplary arms 56b and 58b as well as the interaction of the exemplary arms 56b and 58b is the same.

In the exemplary embodiment, the spring arms 56a and 56b are identically-shaped. The first spring arm 56a can extend between a base end 82a and a distal end 67a. The exemplary base end 82a is mounted to the mounting bracket 14. The exemplary arm 56a is attached to the mounting bracket 14 through a flange portion 60a of the exemplary arm 56a. The arm 56a can be integrally-formed with the bracket 14 or can be attached to the bracket 14 in various embodiments of the present disclosure.

In the exemplary embodiment, at least a portion of a first surface 86a at the base end 82a of the first spring arm 56a can confront and contact at least a portion of a second surface 88 of the mounting bracket 14 when the base end 82a of the first spring arm 56a is mounted to the mounting bracket 14. The at least a portion of the first surface 86a and the at least a portion of the second surface 88 can contact one another in a first plane 90. The first plane 90 can be transverse to the assembly axis 36.

Figure 9:
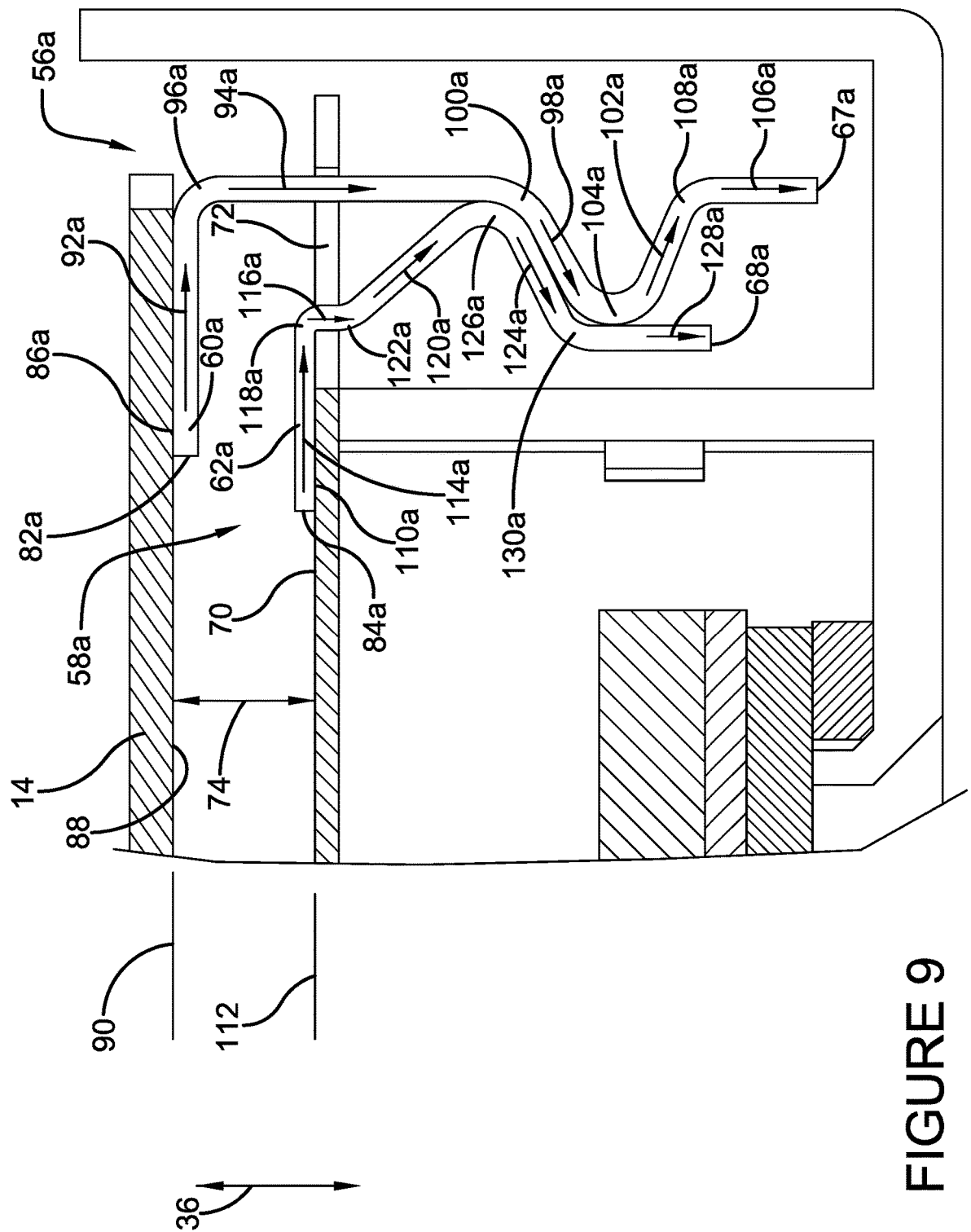
FIG. 9 is an enlarged portion of FIG. 7.
Figure 10:
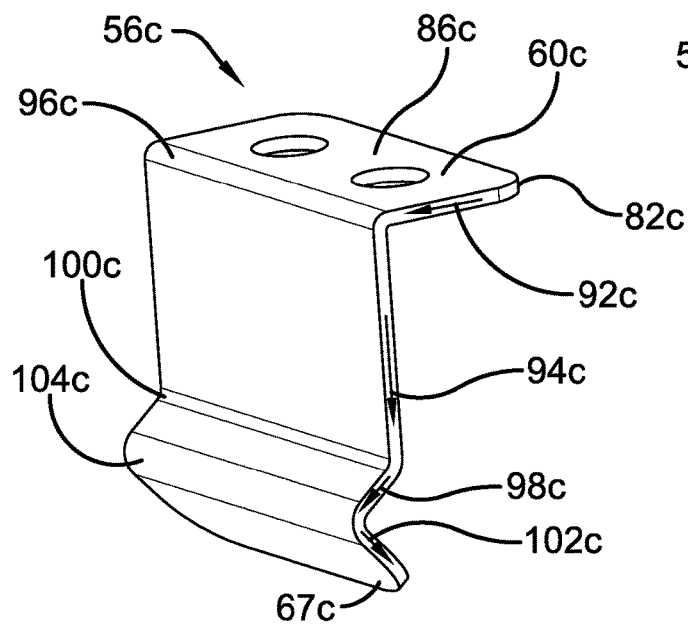
FIG. 10 is a perspective view of an exemplary first spring arm.
Figure 11:
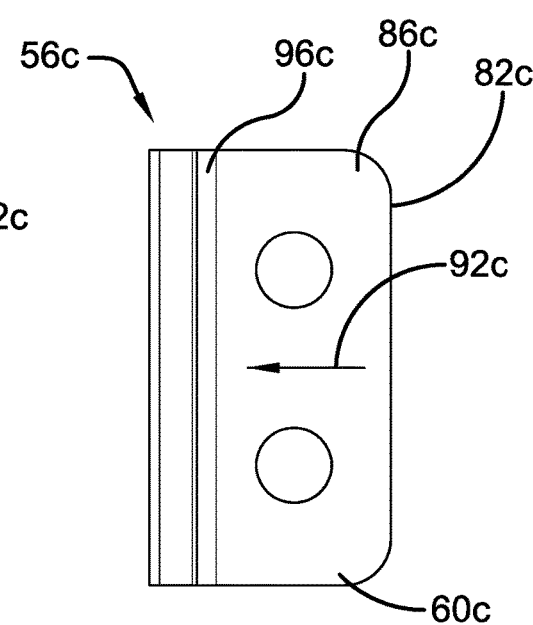
FIG. 11 is a top view of the exemplary first spring arm.
Figure 12:
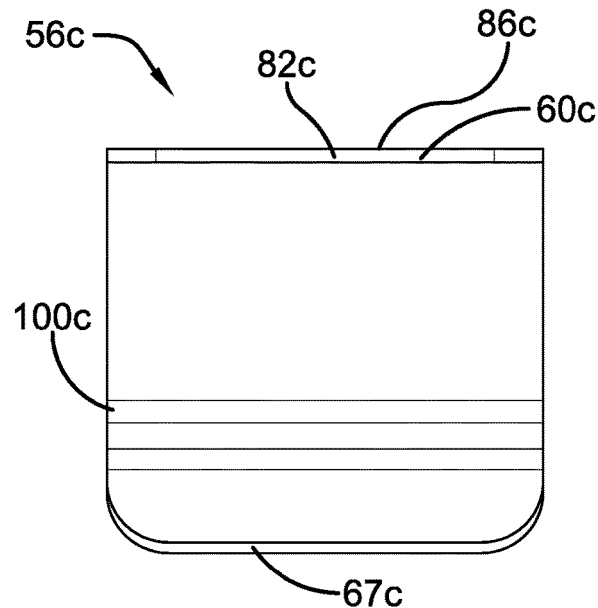
FIG. 12 is a right-side view of the exemplary first spring arm.
Figure 13:
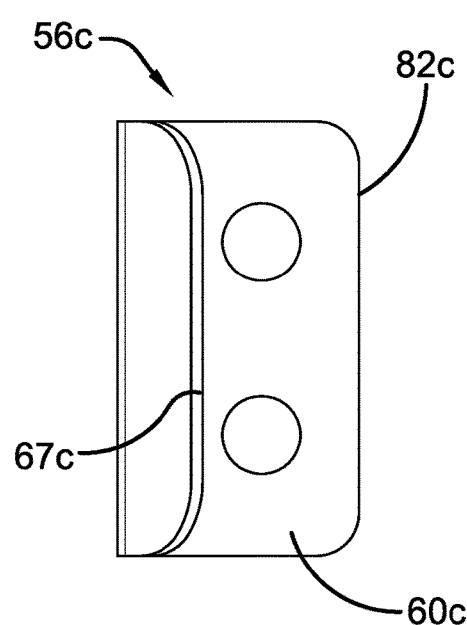
FIG. 13 is a bottom view of the exemplary first spring arm.
Figure 14:
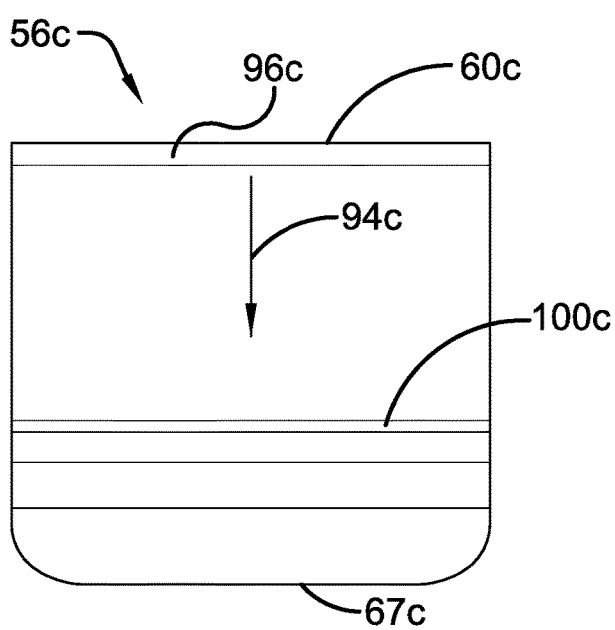
FIG. 14 is a left-side view of the exemplary first spring arm.
Figure 15:
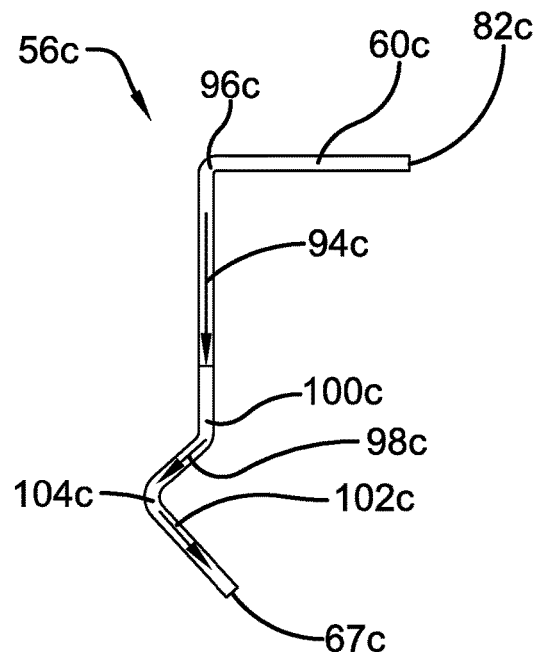
FIG. 15 is a front view of the exemplary first spring arm.
Figure 16:
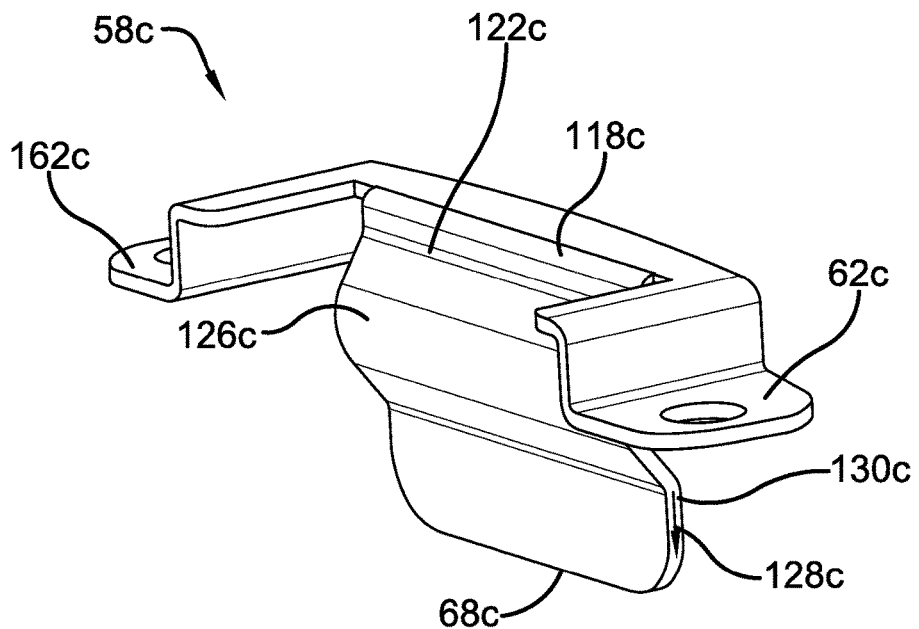
FIG. 16 is a perspective view of an exemplary second spring arm.
Figure 17:
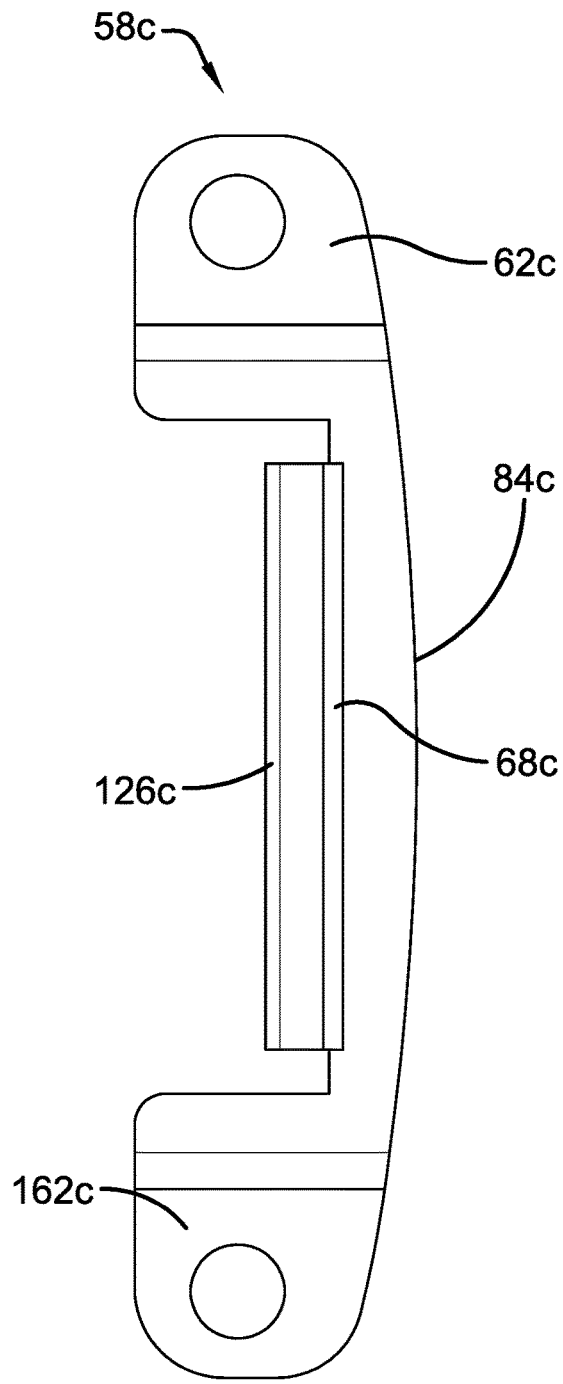
FIG. 17 is a bottom view of the exemplary second spring arm.
Figure 18:
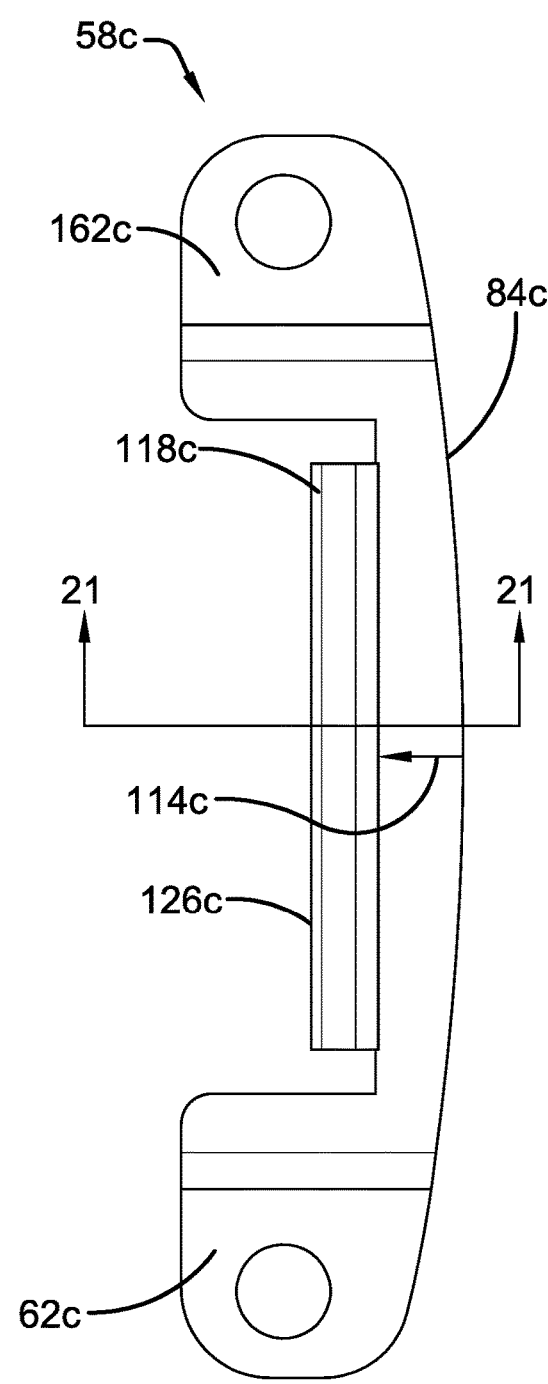
FIG. 18 is a top view of the exemplary second spring arm.
Figure 21:
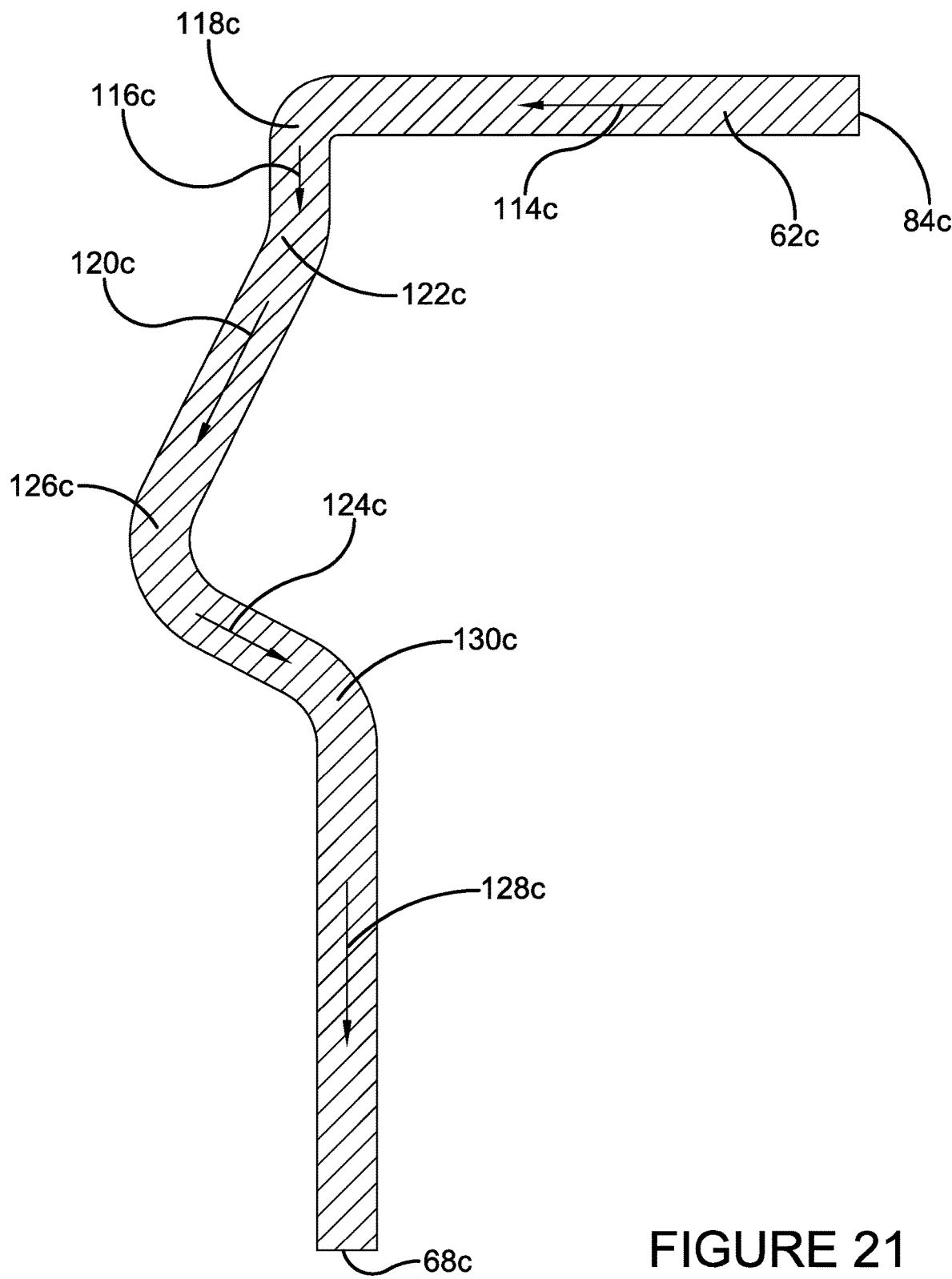
FIG. 21 is a cross-sectional view taken through section lines 21-21 in FIGS. 18 and 19.

The exemplary arm 56a can extend away from the at least a portion of the first surface 86a at the base end 82a initially in a first direction away from the assembly axis 36. The first direction is referenced at 92a. The exemplary arm 56a subsequently extends from the flange portion 60a in a second direction transverse to the first direction and at least partially along the assembly axis 36. The second direction is referenced at 94a and is downward when the lighting arrangement is mounted to a ceiling. A first bend 96a can be defined in the first spring arm 56a, wherein extension of the first spring arm 56a changes from the first direction 92a at the first bend 96a. The first bend 96a can be further from the assembly axis 36 than the base end 82a. It is noted that, as used in present disclosure, a "bend" can refer to a single bend or a "dog-leg" or a pair of bends. The exemplary first direction 92a and the exemplary second direction 94a are defined in a second plane containing the assembly axis 36; the plane of view of FIG. 9 is an exemplary plane that contains the axis 36. The cross-section shown in FIGS. 7 and 9 is constant across the width of the arm 56a; the exemplary arm 56a does not "wrap" or curve about the axis 36.

The first spring arm 56a can extend away from the first bend 96a initially in the second direction 94a at least partially along the longitudinal axis 36 and subsequently in a third direction 98a transverse to the second direction 94a as well as transverse and non-perpendicular to the assembly axis 36. The third direction 98a can be defined in the second plane. A second bend 100a can be defined in the first spring arm 56a wherein extension of the first spring arm 56a changes from the second direction 94a to the third direction 98a at the second bend 100a. The second bend 100a can be spaced further from the first plane 90 along the assembly axis 36 than the first bend 96a.

The first spring arm 56a can extend away from the second bend 100a initially in the third direction 98a and subsequently in a fourth direction 102a transverse to the third direction 98a as well as transverse and non-perpendicular to the assembly axis 36. The fourth direction 102a can be defined in the second plane. A third bend 104a can be defined in the first spring arm 56a wherein extension of the first spring arm 56a changes from the third direction 98a to the fourth direction 102a at the third bend 104a. The third bend 104a can be spaced further from the first plane 90 along the assembly axis 36 than the second bend 100a.

The first spring arm 56a can extend away from the third bend 104a initially in the fourth direction 102a and subsequently in a fifth direction 106a to the distal end 67a of the first spring arm 56a. The fifth direction 106a can be parallel to the assembly axis 36. The fifth direction 106a can be defined in the second plane. A fourth bend 108a can be defined in the first spring arm 56a wherein extension of the first spring arm 56a changes from the fourth direction 102a to the fifth direction 106a at the fourth bend 108a. The fourth bend 108a can be spaced further from the first plane 90 along the assembly axis 36 than the third bend 104a. The distal end 67a of the first spring arm 56a can be spaced further from the first plane 90 along the assembly axis 36 than the first bend 96a, the second bend 100a, the third bend 104a, and the fourth bend 108a.

In the exemplary embodiment, the spring arms 58a and 58b are identically-shaped. The second spring arm 58a can extend between a base end 84a and a distal end 68a wherein the exemplary base end 84a of the second spring arm 58a is mounted to the luminaire 12. The arm 58a can be integrally-formed with the backing plate 30 or can be attached to the backing plate 30. The exemplary arm 58a is attached to the backing plate 30 through a flange portion 62a of the exemplary arm 58a. The cross-section shown in FIGS. 7 and 9 is constant across the width of the arm 58a; the exemplary arm 58a does not "wrap" or curve about the axis 36. Thus, in the exemplary embodiment of the present disclosure, both of the first spring arm 56a and the second spring arm 58a define respective rectilinear widths and each the respective rectilinear width is defined in respective planes that are spaced from and parallel to the assembly axis 36.

At least a portion of a first surface 110a of the base end 84a of the second spring arm 58a confronts and contacts at least a portion of an upper surface 70 of the luminaire 12 when the base end 84a is mounted to the luminaire 12. The at least a portion of the first surface 110a of the second spring arm 58a and the at least a portion of the upper surface 70 of the luminaire 12 contact one another in a third plane 112. The exemplary third plane 112 is transverse to the assembly axis 36. The first plane 90 and third plane 112 are parallel to and spaced from one another along the assembly axis 36 when the luminaire 12 and the mounting bracket 14 are assembled together in the exemplary embodiment of the present disclosure.

The exemplary second spring arm 58a extends away from the at least a portion of the first surface 110a at the base end 84a of the second spring arm 58a initially in a sixth direction 114a away from the assembly axis 36 and subsequently in a seventh direction 116a transverse to the sixth direction 114a and at least partially along the assembly axis 36. A length the second spring arm 58a that extends in the seventh direction 116a is less than a length the first spring arm 56a extending in the second direction 94a in the exemplary embodiment of the present disclosure. The exemplary sixth direction 114a and the exemplary seventh direction 116a are defined in the second plane. A fifth bend 118a can be defined in the second spring arm 58a wherein extension of the second spring arm 58a changes from the sixth direction 114a to the seventh direction 116a at the fifth bend 118a. The exemplary fifth bend 118a is further from the assembly axis 36 than the base end 84a of the second spring arm 58a. In the exemplary embodiment, the third bend 104a and the fifth bend 118a are the same distance from the assembly axis 36.

The exemplary second spring arm 58a extends away from the fifth bend 118a initially in the seventh direction 116a at least partially along the longitudinal axis 36 and subsequently in an eighth direction 120a that is transverse to the seventh direction 116a as well as transverse and non-perpendicular to the assembly axis 36. The exemplary eighth direction 120a is defined in the second plane. A sixth bend 122a can be defined in the second spring arm 58a wherein extension of the second spring arm 58a changes from the seventh direction 116a to the eighth direction 120a at the sixth bend 122a. The exemplary sixth bend 122a is spaced further from the third plane 112 along the assembly axis 36 than the fifth bend 118a.

The exemplary second spring arm 58a extends away from the sixth bend 122a initially in the eighth direction 120a and subsequently in a ninth direction 124a transverse to the eighth direction 120a as well as transverse and non-perpendicular to the assembly axis 36. The exemplary ninth direction 124a is defined in the second plane. A seventh bend 126a defined in the second spring arm 58a wherein extension of the second spring arm 58a changes from the eighth direction 120a to the ninth direction 124a at the seventh bend 126a. The exemplary seventh bend 126a is spaced further from the third plane 112 along the assembly axis 36 than the sixth bend 122a.

The exemplary second spring arm 58a extends away from the seventh bend 126a initially in the ninth direction 124a and subsequently in a tenth direction 128a to the distal end 68a of the second spring arm 58a. The exemplary tenth direction 128a is parallel to the assembly axis 36. The exemplary tenth direction 128a is defined in the second plane. An eighth bend 130a defined in the second spring arm 58a wherein extension of the second spring arm 58a changes from the ninth direction 124a to the tenth direction 128a at the eighth bend 130a. The exemplary eighth bend 130a is spaced further from the third plane 112 along the assembly axis 36 than the seventh bend 126a. The distal end 68a of the exemplary second spring arm 58a is spaced further from the third plane 112 along the assembly axis 36 than the fifth bend 118a, the sixth bend 122a, the seventh bend 126a, and the eighth bend 130a.

In one approach to installation of the lighting arrangement 10, the mounting bracket 14 can be attached to a junction box using fasteners passing through one or more of the apertures 52a-52e. Wiring connections between the luminaire 12 and wires in the junction box can then be completed. The wires can pass through the aperture 54. The luminaire 12 can then be raised until the distal ends of the arms 56a, 56b, such as distal end 67a, either contact the upper surface 70 of the backing plate 30 or the distal ends are received in slots defined in the backing plate 30, such as slot 72. When the distal ends of the arms 56a, 56b initially contact the upper surface 70 of the backing plate 30, the luminaire 12 can be rotated until the distal ends are aligned with the slots and the luminaire 12 can then be raised further. In the exemplary embodiment, the slots are sized so that the first spring arms 56a, 56b are substantially precluded from shifting about the assembly axis 36 once received in the slots. In the exemplary embodiment, the first spring arm 56a is received in the slot 72 of the luminaire 12 before the hub 32 is received in the aperture 54 of the mounting bracket 14 when the luminaire 12 and the mounting bracket 14 are moved toward one another along the assembly axis 36.

After the distal ends of the spring arms 56a, 56b are aligned with the slots, the luminaire 12 can be raised upward further, thus moving the luminaire 12 and the mounting bracket 14 closer together along the assembly axis 36 for interconnection. The interaction between the exemplary arms 56a, 58a will be described in detail and the interaction between the exemplary arms 56b, 58b would be the same.

The exemplary arms 56a, 58a slide across one another during interconnection of the luminaire 12 and the bracket 14. One or both arms 56a, 58a can elastically deform during this relative, sliding movement. In the exemplary embodiment, the fifth bend 118a and the third bend 104a are the respective first portions of the second spring arm 58a and the first spring arm 56a to contact one another. Engagement between the third bend 104a and the fifth bend 118a results in the first spring arm 56a being elastically deformed about the first bend 96a. During further movement of the luminaire 12 and the mounting bracket 14 closer together along the assembly axis 36 for interconnection, after the fifth bend 118a and the third bend 104a contact and move past one another, the third bend 104a slides along a length of the second spring arm 58a that extends in the seventh direction 116a, the bend 122a, and a length of the second spring arm 58a that extends in the eighth direction 120a.

In the exemplary embodiment, both of the first spring arm 56a and the second spring arm 58a are concurrently elastically deformed during a first portion of relative movement of the luminaire 12 and the mounting bracket 14 closer together along the assembly axis 36. The exemplary first portion of relative movement corresponds to the third bend 104a sliding along a length of the second spring arm 58a that extends in the eighth direction 120a. The spring arm 58a is bent toward the axis 36 about the bend 118a and the spring arm 56a is bent away from the axis 36 about the bend 96a.

In the exemplary embodiment, during movement of the luminaire 12 and the mounting bracket 14 closer together along the assembly axis 36 for interconnection, after the bend 104a slides along the length of the second spring arm 58a that extends in the eighth direction 120a, the first spring arm 56a and the second spring arm 58a press against one another and maximally deform one another through contact between the third bend 104a and the seventh bend 126a. The first spring arm 56a elastically bends about the first bend 96a and the second spring arm 58a elastically bends about the fifth bend 118a.

During further movement of the luminaire 12 and the mounting bracket 14 closer together along the assembly axis 36 for interconnection, after the third bend 104a and the seventh bend 126a contact and pass one another, the seventh bend 126a slides along a length of the first spring arm 56a that extends in the third direction 98a and the bend 104a slides along a length of the second spring arm 58a that extends in the direction 124a. The relative movement occurring as the seventh bend 126a slides along a length of the first spring arm 56a that extends in the third direction 98a and the bend 104a slides along a length of the second spring arm 58a that extends in the direction 124a is referred to as a second portion of relative movement. Both the exemplary first spring arm 56a and the exemplary second spring arm 58a concurrently at least partially recover from deformation during the second portion of relative movement of the luminaire 12 and the mounting bracket 14 closer together along the assembly axis 36. Thus, the first portion of relative movement and the second portion of relative movement are different from one another and the first portion of relative movement occurs before the second portion of relative movement during assembly of the luminaire 12 and the mounting bracket 14.

Also, during the second portion of relative movement, the exemplary second spring arm 58a is urged toward the first plane 90 by elastic recovery of the first spring arm 56a. Further, the luminaire 12 is thus drawn toward the mounting bracket 14. This drawing-up indicates to the human user/installer that assembly has been completed. This drawing-up can produce a tactile sensation felt by the installer and can thus indicate to the installer that the mounting of the luminaire 12 on the mounting bracket 14 was successfully completed.

After interconnection is complete in the exemplary embodiment, the length of the spring arm 56a that extends in the second direction 94a and the length of the spring arm 58a that extends in the seventh direction 116a are parallel to the assembly axis 36. Also, after interconnection is complete in the exemplary embodiment, a portion of the spring arm 58a that extends in the ninth direction 124a rests on and contacts a portion of the spring arm 56a that extends in the third direction 98a. Thus, in the exemplary embodiment, the third direction 98a includes a vector component that is normal to and directed at the assembly axis 36 and the eighth direction 120a includes a vector component that is normal to and directed away from the assembly axis 36 when the luminaire 12 and the mounting bracket 14 are assembled together. Further, in the exemplary embodiment, the second direction 94a is parallel to the assembly axis 36 and the eighth direction 120a includes a vector component that is normal to and directed away from the assembly axis 36 when the luminaire 12 and the mounting bracket 14 are assembled together. Further, in the exemplary embodiment, both of the third direction 98a and the ninth direction 124a include respective vector components that are normal to and directed at the assembly axis 36 and also include respective vector components that are parallel to the assembly axis 36 when the luminaire 12 and the mounting bracket 14 are assembled together.

The vertical distance between the surface 86a of the flange portion 60a that contacts the mounting bracket 14 and the distal end 67a (the height of the arm 56a) can be selected to limit/control the proximity of the surface 70 to the mounting bracket 14. This gap is referenced at 74 in FIG. 9. Also, the vertical distance between the bend 130a and the distal end 68a can be selected to ensure that the distal end 68a is not raised above the bend 104a during installation. This can be desirable to prevent the distal end 68a from engaging the bend 104a as a barb when the luminaire 12 is lowered and disengaged from the mounting bracket 14.

Spring arms according to another embodiment of the present disclosure is shown in FIGS. 10-21. FIGS. 10-15 disclose a spring arm 56c. The spring arm 56c can be mounted to a mounting bracket, such as mounting bracket 14. FIGS. 16-21 disclose a spring arm 58c. The spring arm 58c can be mounted to a luminaire, such as luminaire 12.

The first spring arm 56c can extend between a base end 82c and a distal end 67c. The exemplary arm 56c includes a flange portion 60c. In the exemplary embodiment, at least a portion of a first surface 86c at the base end 82c of the first spring arm 56c can confront and contact at least a portion of a second surface of a mounting bracket when the base end 82c of the first spring arm 56c is mounted to the mounting bracket. The exemplary arm 56c can extend away from the at least a portion of the first surface 86c at the base end 82c initially in a first direction away from the assembly axis. The first direction is referenced at 92c.

The exemplary arm 56c subsequently extends from the flange portion 60c in a second direction transverse to the first direction and at least partially along the assembly axis. The second direction is referenced at 94c and is downward when the lighting arrangement is mounted to a ceiling. A first bend 96c can be defined in the first spring arm 56c, wherein extension of the first spring arm 56c changes from the first direction 92c at the first bend 96c. The first bend 96c can be further from the assembly axis than the base end 82c.

The first spring arm 56c can extend away from the first bend 96c initially in the second direction 94c at least partially along the longitudinal axis and subsequently in a third direction 98c transverse to the second direction 94c as well as transverse and non-perpendicular to the assembly axis. A second bend 100c can be defined in the first spring arm 56c wherein extension of the first spring arm 56c changes from the second direction 94c to the third direction 98c at the second bend 100c.

The first spring arm 56c can extend away from the second bend 100c initially in the third direction 98c and subsequently in a fourth direction 102c transverse to the third direction 98c as well as transverse and non-perpendicular to the assembly axis, to the distal end 67c of the first spring arm 56c. The fourth direction 102c can be defined in the second plane. A third bend 104c can be defined in the first spring arm 56c wherein extension of the first spring arm 56c changes from the third direction 98c to the fourth direction 102c at the third bend 104c.

The second spring arm 58c can extend between a base end 84c and a distal end 68c. The exemplary base end 84c of the second spring arm 58c can be mounted to a luminaire. The arm 58c can be integrally-formed with a backing plate, such as backing plate 30, or can be attached to the backing plate through flange portions 62c and 162c.

The exemplary second spring arm 58c extends away from the base end 84c of the second spring arm 58c initially in a sixth direction 114c toward the assembly axis and subsequently in a seventh direction 116c transverse to the sixth direction 114c and at least partially along the assembly axis. A fifth bend 118c can be defined in the second spring arm 58c wherein extension of the second spring arm 58c changes from the sixth direction 114c to the seventh direction 116c at the fifth bend 118c.

The exemplary second spring arm 58c extends away from the fifth bend 118c initially in the seventh direction 116c and subsequently in an eighth direction 120c that is transverse to the seventh direction 116c as well as transverse and non-perpendicular to the assembly axis. A sixth bend 122c can be defined in the second spring arm 58c wherein extension of the second spring arm 58c changes from the seventh direction 116c to the eighth direction 120c at the sixth bend 122c.

The exemplary second spring arm 58c extends away from the sixth bend 122c initially in the eighth direction 120c and subsequently in a ninth direction 124c transverse to the eighth direction 120c as well as transverse and non-perpendicular to the assembly axis. It is noted that the view in FIG.

21 is the second plane. A seventh bend 126*c* defined in the second spring arm 58*c* wherein extension of the second spring arm 58*c* changes from the eighth direction 120*c* to the ninth direction 124*c* at the seventh bend 126*c*.

The exemplary second spring arm 58*c* extends away from the seventh bend 126*c* initially in the ninth direction 124*c* and subsequently in a tenth direction 128*c* to the distal end 68*c* of the second spring arm 58*c*. The exemplary tenth direction 128*c* is parallel to the assembly axis. The exemplary tenth direction 128*c* is defined in the second plane. An eighth bend 130*c* defined in the second spring arm 58*c* wherein extension of the second spring arm 58*c* changes from the ninth direction 124*c* to the tenth direction 128*c* at the eighth bend 130*c*. The exemplary eighth bend 130*c* is spaced further from the third plane 112 along the assembly axis than the seventh bend 126*c*. The distal end 68*c* of the exemplary second spring arm 58*c* is spaced further from the third plane 112 along the assembly axis than the fifth bend 118*c*, the sixth bend 122*c*, the seventh bend 126*c*, and the eighth bend 130*c*.

In one approach to installation of a lighting arrangement including the spring arms 56*c* and 58*c*, a mounting bracket such as mounting bracket can be attached to a junction box using fasteners. Wiring connections between a luminaire such as the luminaire and wires in the junction box can then be completed. The luminaire can then be raised until the distal end 67*c* of the arm 56*c*, which is attached to the mounting bracket, either contacts an upper surface of a backing plate of the luminaire or the distal end 67*c* is received in a gap defined between the flange portions 62*c*, 162*c*. If the distal end 67*c* initially contacts the upper surface of the backing plate of the luminaire, the luminaire can be rotated until the distal end 67*c* is aligned with the gap defined between the flange portions 62*c*, 162*c* and the luminaire can then be raised further. In the exemplary embodiment, the gap defined between the flange portions 62*c*, 162*c* is sized so that the spring arms 56*c* is substantially precluded from shifting about the assembly axis once received in the gap defined between the flange portions 62*c*, 162*c*. In the exemplary embodiment, the first spring arm 56*c* is received in the slot 72 of the luminaire before the hub 32 is received in the aperture 54 of the mounting bracket when the luminaire and the mounting bracket are moved toward one another along the assembly axis.

After the distal ends of the spring arms 56*c* are aligned with the gap defined between the flange portions 62*c*, 162*c*, the luminaire can be raised upward further, thus moving the luminaire and the mounting bracket closer together along the assembly axis for interconnection. The exemplary arms 56*c*, 58*c* slide across one another during interconnection of the luminaire and the bracket. One or both arms 56*c*, 58*c* can elastically deform during this relative, sliding movement. In the exemplary embodiment, the fifth bend 118*c* and the third bend 104*c* are the respective first portions of the spring arm 58*c* and the spring arm 56*c* to contact one another. Engagement between the third bend 104*c* and the fifth bend 118*c* results in the first spring arm 56*c* being elastically deformed about the first bend 96*c*, toward the axis. During further movement of the luminaire and the mounting bracket closer together along the assembly axis for interconnection, after the fifth bend 118*c* and the third bend 104*c* contact and move past one another, the third bend 104*c* slides along a length of the second spring arm 58*c* that extends in the seventh direction 116*c*, the bend 122*c*, and a length of the second spring arm 58*c* that extends in the eighth direction 120*c*.

In the exemplary embodiment, both of the first spring arm 56*c* and the second spring arm 58*c* are concurrently elastically deformed during a first portion of relative movement of the luminaire and the mounting bracket closer together along the assembly axis. The exemplary first portion of relative movement corresponds to the third bend 104*c* sliding along a length of the second spring arm 58*c* that extends in the eighth direction 120*c*. The spring arm 58*c* is bent away from the axis about the bend 118*c* and the spring arm 56*c* is bent toward from the axis about the bend 96*c*.

In the exemplary embodiment, during movement of the luminaire and the mounting bracket closer together along the assembly axis for interconnection, after the bend 104*c* slides along the length of the second spring arm 58*c* that extends in the eighth direction 120*c*, the first spring arm 56*c* and the second spring arm 58*c* press against one another and maximally deform one another through contact between the third bend 104*c* and the seventh bend 126*c*. The first spring arm 56*c* elastically bends about the first bend 96*c* and the second spring arm 58*c* elastically bends about the fifth bend 118*c*.

During further movement of the luminaire and the mounting bracket closer together along the assembly axis for interconnection, after the third bend 104*c* and the seventh bend 126*c* contact and pass one another, the seventh bend 126*c* slides along a length of the first spring arm 56*c* that extends in the third direction 98*c* and the bend 104*c* slides along a length of the second spring arm 58*c* that extends in the direction 124*c*. The relative movement occurring as the seventh bend 126*c* slides along a length of the first spring arm 56*c* that extends in the third direction 98*c* and the bend 104*c* slides along a length of the second spring arm 58*c* that extends in the direction 124*c* is referred to as a second portion of relative movement. Both the exemplary first spring arm 56*c* and the exemplary second spring arm 58*c* concurrently at least partially recover from deformation during the second portion of relative movement of the luminaire and the mounting bracket closer together along the assembly axis. Thus, the first portion of relative movement and the second portion of relative movement are different from one another and the first portion of relative movement occurs before the second portion of relative movement during assembly of the luminaire and the mounting bracket.

Also, during the second portion of relative movement, the exemplary second spring arm 58*c* is urged toward a first plane, such as the first plane 90, by elastic recovery of the first spring arm 56*c*. Further, the luminaire is thus drawn toward the mounting bracket. This drawing-up indicates to the human user/installer that assembly has been completed. This drawing-up can produce a tactile sensation felt by the installer and can thus indicate to the installer that the mounting of the luminaire on the mounting bracket was successfully completed.

After interconnection is complete in the exemplary embodiment, the length of the spring arm 56*c* that extends in the second direction 94*c* and the length of the spring arm 58*c* that extends in the seventh direction 116*c* can be parallel to the assembly axis. Also, after interconnection is complete in the exemplary embodiment, a portion of the spring arm 58*c* that extends in the ninth direction 124*c* rests on and contacts a portion of the spring arm 56*c* that extends in the third direction 98*c*. Thus, in the exemplary embodiment, the third direction 98*c* includes a vector component that is normal to and directed at the assembly axis and the eighth direction 120*c* includes a vector component that is normal to and directed away from the assembly axis when the luminaire and the mounting bracket are assembled together. Further, in the exemplary embodiment, the second direction 94*c* is parallel to the assembly axis and the eighth direction 120*c* includes a vector component that is normal to and directed away from the assembly axis when the luminaire and the mounting bracket are assembled together. Further, in the exemplary embodiment, both of the third direction 98c and the ninth direction 124c include respective vector components that are normal to and directed at the assembly axis and also include respective vector components that are parallel to the assembly axis when the luminaire and the mounting bracket are assembled together.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein is hereby unconditionally reserved. The use of the word "can" in this document is not an assertion that the subject preceeding the word is unimportant or unnecessary or "not critical" relative to anything else in this document. The word "can" is used herein in a positive and affirming sense and no other motive should be presumed. More than one "invention" may be disclosed in the present disclosure; an "invention" is defined strictly by the content of a patent claim and not by what is written in a detailed description of an embodiment of an invention.

What is claimed is:

1. A lighting arrangement comprising:
  a mounting bracket releasably mountable to at least one of a junction box, a wall and a ceiling;
  a luminaire extending along a longitudinal axis between a light emanating face and a rear face, said luminaire including at least one light emitting unit and configured to emit light from said light emanating face;
  at least one first spring arm extending between a base end and a distal end wherein said base end is mounted to a first of said mounting bracket and said luminaire;
  at least one second spring arm extending between a base end and a distal end wherein said base end of said at least one second spring arm is mounted to a second of said mounting bracket and said luminaire;
  wherein said at least one first spring arm and said at least one second spring arm are selectively engageable with one another to releasably engage said mounting bracket and said luminaire together;
  wherein said at least one first spring arm and said at least one second spring arm slide across each other as said luminaire and said mounting bracket are moved closer together along an assembly axis, said longitudinal axis collinear with said assembly axis when said luminaire and said mounting bracket are assembled together;
  wherein at least a portion of a first surface at said base end of said at least one first spring arm confronts and contacts at least a portion of a second surface of said first of said mounting bracket and said luminaire when said base end of said at least one first spring arm is mounted to said first of said mounting bracket and said luminaire, said at least a portion of said first surface and said at least a portion of said second surface contact one another in a first plane, said first plane transverse to said assembly axis;
  wherein said at least one first spring arm extends away from said at least a portion of said first surface at said base end of said at least one first spring arm initially in a first direction relative to said assembly axis and subsequently in a second direction transverse to said first direction and at least partially along said assembly axis, said first direction and said second direction defined in a second plane containing said assembly axis, a first bend defined in said at least one first spring arm wherein extension of said at least one first spring arm changes from said first direction at said first bend, said first bend further from said assembly axis than said base end of said at least one first spring arm;
  wherein said at least one first spring arm extends away from said first bend initially in said second direction at least partially along said longitudinal axis and subsequently in a third direction transverse to said second direction as well as transverse and non-perpendicular to said assembly axis, said third direction defined in said second plane, a second bend defined in said at least one first spring arm wherein extension of said at least one first spring arm changes from said second direction to said third direction at said second bend, said second bend spaced further from said first plane along said assembly axis than said first bend;
  wherein said at least one first spring arm extends away from said second bend initially in said third direction and subsequently in a fourth direction transverse to said third direction as well as transverse and non-perpendicular to said assembly axis, said fourth direction defined in said second plane, a third bend defined in said at least one first spring arm wherein extension of said at least one first spring arm changes from said third direction to said fourth direction at said third bend, said third bend spaced further from said first plane along said assembly axis than said second bend;
  wherein said distal end of said at least one first spring arm is spaced further from said first plane along said assembly axis than said first bend, said second bend, and said third bend.

2. The lighting arrangement of claim 1 wherein at least a portion of a first surface of said base end of said at least one second spring arm confronts and contacts at least a portion of a second surface of said second of said mounting bracket and said luminaire when said base end of said at least one second spring arm is mounted to said second of said mounting bracket and said luminaire, said at least a portion of said first surface of said at least one second spring arm and said at least a portion of said second surface of said second of said mounting bracket and said luminaire contact one another in a third plane, said third plane transverse to said assembly axis;
  wherein said at least one second spring arm extends away from said at least a portion of said first surface at said base end of said at least one second spring arm initially in a sixth direction relative to said assembly axis and subsequently in a seventh direction transverse to said sixth direction and at least partially along said assembly axis, said sixth direction and said seventh direction defined in said second plane, a fifth bend defined in said at least one second spring arm wherein extension of said at least one second spring arm changes from said sixth direction at said fifth bend, said fifth bend further from said assembly axis than said base end of said at least one second spring arm;

wherein said at least one second spring arm extends away from said fifth bend initially in said seventh direction at least partially along said longitudinal axis and subsequently in an eighth direction that is transverse to said seventh direction as well as transverse and non-perpendicular to said assembly axis, said eighth direction defined in said second plane, a sixth bend defined in said at least one second spring arm wherein extension of said at least one second spring arm changes from said seventh direction to said eighth direction at said sixth bend, said sixth bend spaced further from said third plane along said assembly axis than said fifth bend;

wherein said at least one second spring arm extends away from said sixth bend initially in said eighth direction and subsequently in a ninth direction transverse to said eighth direction as well as transverse and non-perpendicular to said assembly axis, said ninth direction defined in said second plane, a seventh bend defined in said at least one second spring arm wherein extension of said at least one second spring arm changes from said eighth direction to said ninth direction at said seventh bend, said seventh bend spaced further from said third plane along said assembly axis than said sixth bend;

wherein said at least one second spring arm extends away from said seventh bend initially in said ninth direction and subsequently in a tenth direction to said distal end of said at least one second spring arm, said tenth direction parallel to said assembly axis, said tenth direction defined in said second plane, an eighth bend defined in said at least one second spring arm wherein extension of said at least one second spring arm changes from said ninth direction to said tenth direction at said eighth bend, said eighth bend spaced further from said third plane along said assembly axis than said seventh bend; and wherein said distal end of said at least one second spring arm is spaced further from said third plane along said assembly axis than said fifth bend, said sixth bend, said seventh bend, and said eighth bend.

3. The lighting arrangement of claim 2 wherein:

both of said at least one first spring arm and said at least one second spring arm are concurrently elastically deformed during a first portion of relative movement of said luminaire and said mounting bracket closer together along said assembly axis; and both of said at least one first spring arm and said at least one second spring arm concurrently at least partially recover during a second portion of relative movement of said luminaire and said mounting bracket closer together along said assembly axis said first portion of relative movement and said second portion of relative movement different from one another.

4. The lighting arrangement of claim 3 wherein said first portion of relative movement occurs before said second portion of relative movement during assembly of said luminaire and said mounting bracket.

5. The lighting arrangement of claim 3 wherein said luminaire is drawn toward said mounting bracket during said second portion of relative movement.

6. The lighting arrangement of claim 2 wherein said first plane and third plane are parallel to and spaced from one another along said assembly axis when said luminaire and said mounting bracket are assembled together.

7. The lighting arrangement of claim 2 wherein both of said second direction and said seventh direction are parallel to said assembly axis when said luminaire and said mounting bracket are assembled together.

8. The lighting arrangement of claim 7 wherein a length said at least one second spring arm extending in said seventh direction is less than a length said at least one first spring arm extending in said second direction.

9. The lighting arrangement of claim 2 wherein one of said third direction and said eighth direction includes a vector component normal to and directed at said assembly axis and the other of said third direction and said eighth direction includes a vector component normal to and directed away from said assembly axis when said luminaire and said mounting bracket are assembled together.

10. The lighting arrangement of claim 2 wherein one of said second direction and said eighth direction is parallel to said assembly axis and the other of said second direction and said eighth direction includes a vector component normal to and directed away from said assembly axis when said luminaire and said mounting bracket are assembled together.

11. The lighting arrangement of claim 2 wherein both of said third direction and said ninth direction include respective vector components normal to and directed at said assembly axis and also include respective vector components parallel to said assembly axis.

12. The lighting arrangement of claim 11 wherein a portion of said at least one second spring arm that extends in said ninth direction rests on and contacts a portion of said at least one first spring arm that extends in said third direction.

13. The lighting arrangement of claim 2 wherein said third bend and said fifth bend are the same distance from said assembly axis.

14. The lighting arrangement of claim 2 wherein, during movement of said luminaire and said mounting bracket closer together along said assembly axis for interconnection, said fifth bend and said third bend are the respective first portions of said at least one second spring arm and said at least one first spring arm to contact one another and engagement between said third bend and said fifth bend results in said at least one first spring arm being elastically deformed about said first bend.

15. The lighting arrangement of claim 14 wherein, during movement of said luminaire and said mounting bracket closer together along said assembly axis for interconnection after said fifth bend and said third bend contact and move past one another, said third bend slides along a length of said at least one second spring arm that extends in said eighth direction.

16. The lighting arrangement of claim 15 wherein, during movement of said luminaire and said mounting bracket closer together along said assembly axis for interconnection after said fifth bend slides along said length of said at least one second spring arm that extends in said eighth direction, said at least one first spring arm and said at least one second spring arm press against one another and maximally deform one another through contact between said third bend and said seventh bend, said at least one first spring arm elastically bending about said first bend and said at least one second spring arm elastically bending about said fifth bend.

17. The lighting arrangement of claim 16 wherein, during movement of said luminaire and said mounting bracket closer together along said assembly axis for interconnection after said third bend and said seventh bend contact and pass one another, said seventh bend slides along a length of said at least one first spring arm that extends in said third direction, whereby said at least one second spring arm is urged toward said first plane by elastic recovery of said at least one first spring arm.

18. The lighting arrangement of claim 2 wherein:
said at least one first spring arm is further defined as mounted to said mounting bracket and said at least one second spring arm is further defined as mounted to said luminaire;
said luminaire defines a slot in said rear face configured to receive said at least one first spring arm; and
said slot is sized whereby said at least one first spring arm is precluded from shifting about said assembly axis.

19. The lighting arrangement of claim 18 wherein:
said mounting bracket further comprises an aperture spaced from said at least one first spring arm and said at least one second spring arm, said aperture centered on said assembly axis;
said luminaire further comprises a hub at said rear face and received in said aperture of said mounting bracket; and
said at least one first spring arm is received in said slot of said luminaire before said hub is received in said aperture of said mounting bracket when said luminaire and said mounting bracket are moved toward one another along said assembly axis.

20. The lighting arrangement of claim 2 wherein both of said at least one first spring arm and said at least one second spring arm define respective rectilinear widths, each said respective rectilinear width defined in respective planes that are spaced from and parallel to said assembly axis.

* * * * *